(12) United States Patent
Beeman et al.

(10) Patent No.: US 12,258,293 B2
(45) Date of Patent: Mar. 25, 2025

(54) HYBRID STRUCTURAL POLYMER-BINDER COMPOSITE CONSTRUCTION AND PAVING MATERIAL

(71) Applicant: New Village Initiative LLC, Orlando, FL (US)

(72) Inventors: Gary Beeman, Park Rapids, MN (US); Andrew T. LaCroix, Kirkwood, MO (US); Donald Russell, Oakland, FL (US); Michael Yonker, Waukee, IA (US); Mark D. Beeman, Sandpoint, ID (US)

(73) Assignee: New Village Initiative LLC, Orlando, FL (US)

( * ) Notice: Subject to any disclaimer, the term of this patent is extended or adjusted under 35 U.S.C. 154(b) by 448 days.

(21) Appl. No.: 17/463,454

(22) Filed: Aug. 31, 2021

(65) Prior Publication Data

US 2022/0064065 A1    Mar. 3, 2022

Related U.S. Application Data

(60) Provisional application No. 63/072,303, filed on Aug. 31, 2020.

(51) Int. Cl.
| | |
|---|---|
| C04B 20/00 | (2006.01) |
| C04B 16/06 | (2006.01) |
| C04B 16/10 | (2006.01) |
| C04B 16/12 | (2006.01) |
| C04B 20/04 | (2006.01) |
| C04B 20/10 | (2006.01) |
| C04B 26/26 | (2006.01) |

(52) U.S. Cl.
CPC ...... *C04B 20/0008* (2013.01); *C04B 16/0633* (2013.01); *C04B 16/0666* (2013.01); *C04B 16/10* (2013.01); *C04B 16/12* (2013.01); *C04B 20/0048* (2013.01); *C04B 20/04* (2013.01); *C04B 20/1077* (2013.01); *C04B 26/26* (2013.01)

(58) Field of Classification Search
None
See application file for complete search history.

(56) References Cited

U.S. PATENT DOCUMENTS

| | | | | |
|---|---|---|---|---|
| 2,257,083 | A * | 9/1941 | Buffington | C08L 7/02 |
| | | | | 524/925 |
| 8,802,754 | B2 * | 8/2014 | Nie | C08L 23/02 |
| | | | | 524/47 |
| 11,591,524 | B2 * | 2/2023 | Horton | C04B 26/26 |

(Continued)

*Primary Examiner* — John J Figueroa
(74) *Attorney, Agent, or Firm* — Eckert Seamans Cherin & Mellott, LLC

(57) ABSTRACT

A hybrid additive for use in construction materials such as asphalt and concrete is disclosed. The additive includes pellets formed of a plastic or polymer material, and one or more of fibers, pozzolans, nano-carbon tubes, glass, recycled asphalt shingles (RAS), liquid anti-strip, hydrated lime, rejuvenators, cementitious material, and ground tire rubber. Also disclosed are hybrid composite materials useful as paving and building materials, and methods of making the same. The hybrid additives were found to maintain the positive performance aspects of typical asphalt and concrete mixtures, while improving the performance of the mixtures by increasing bonding and strength within the mixture—and therefore increasing useable life and lowering costs.

23 Claims, 9 Drawing Sheets

(56) References Cited

U.S. PATENT DOCUMENTS

| | | | |
|---|---|---|---|
| 2011/0233105 A1* | 9/2011 | Bailey | C09D 195/00 |
| | | | 106/272 |
| 2016/0236980 A1* | 8/2016 | Muellenbach | C08L 95/00 |
| 2017/0081516 A1* | 3/2017 | Yoo | E01C 7/18 |
| 2018/0272565 A1* | 9/2018 | Zhamu | B02C 17/186 |

* cited by examiner

HYBRID STRUCTURAL POLYMER-BINDER COMPOSITE CONSTRUCTION AND PAVING MATERIAL

CROSS-REFERENCE TO RELATED APPLICATIONS

This application claims priority to U.S. Provisional Application Ser. No. 63/072,303, filed Aug. 31, 2020, which is incorporated herein by reference in its entirety.

FIELD OF THE INVENTION

The invention relates generally to construction and paving materials.

BACKGROUND

Construction material limitations are generally tied to strength, usable life, and cost effectiveness. Currently, there are a number of solutions designed to improve these aspects of construction and pavement materials.

Some of these solutions attempt to increase the adhesion and cohesion of construction composites. These solutions often fail to meet the needs of the industry because they fail to address inconsistencies of materials, such as cementitious materials, aggregate, and additives, that cause poor bonding in construction materials, such as concrete or asphalt mixtures. As an example in the paving industry, asphalt binders can be modified using elastomeric polymers, such as styrene-butadiene-styrene (SBS) and styrene butadiene rubber (SBR), and plastomers, such as polypropylene (PP) and polystyrene (PS). The compatibility and storage stability of these polymers when introduced using wet processes in the asphalt binder are frequent concerns due to variability in quality, performance over temperature variations, separation, and mixing issues. As an example in the building industry, cement mixtures are modified with fly ash, which varies significantly in its performance depending on the source.

Furthermore, asphalt binders are refined products of crude oils. Since crude oils are globally traded products, the source and thereby the composition of a crude oil can vary greatly on a daily basis depending on the crude source for a given refinery. In addition, refineries extract other products, such as gasoline, heating oil, lubricants, etc., from the crude oil, which can vary depending on seasonal needs and further change the composition of asphalt binders. Therefore, asphalt binder performance with a given aggregate can varying greatly depending on the refining operations.

Likewise, aggregates can affect the performance of cementitious construction materials. The properties of aggregates can vary greatly depending upon the source of the material, such as natural or quarried aggregate, the number and quality of crushed faces to increase internal friction, and the reaction of aggregates to different chemical processes, such as products of internal hydration or inorganic salts applied to the surface. Furthermore, aggregates typically are limited to local materials to reduce shipping costs, so changing aggregate sources is difficult and contractors must work with variability of the available materials.

Another reason that solutions to increase the adhesion and cohesion fail to meet the needs of the construction materials industry is these solutions function as optimizations which require precise dosing to prevent poorer bonding of the composite construction materials as the dosage varies from the optimum dosage. Moreover, some of these solutions are formulated for specific types of aggregates with positive or negative surface charges, such as granite, limestone, basalt, etc., and thereby are not suitable for use across a broad range of aggregate types.

Still, other solutions seek to strengthen construction materials to reduce deformation and increase the structural coefficient of the material in a structure, such as a pavement or a building wall or column, but these solutions also fail to meet industry needs due to difficulties in producing the composite mixture. Some solutions, e.g., fiber additives, require specialized equipment to administer the additive into the production plant. Some solutions do not disperse well within the mixture. Furthermore, some solutions require difficult, cumbersome processes that require large amounts of space at a production plant to implement.

Still, other solutions seek to increase the ability to include recycled aggregate materials (RAM), such as recycled or reclaimed asphalt pavement (RAP), recycled asphalt shingles (RAS), and recycled concrete (RC), into construction composites. These solutions also fail to meet industry needs because they reduce the strength of the mixture due to poor bonding between the RAM and virgin components to the point that excessive structural deflections occur, and thereby cracking, or the solutions increase the brittleness of the mixture, which decreases the cracking resistance of the mixture. Furthermore, these solutions do not address the inconsistencies of RAM.

RAM has similar inconsistencies as aggregate material, including source and quality of material. RAM also has inconsistencies in source, quality, and consistency of the binder or cement that coats the aggregate. In addition, RAM is stockpiled like aggregates, which means that it can contain moisture due to exposure to rain and humidity. These inconsistencies have created natural limits to the amount of RAM that can be used in composite construction mixtures, such as asphalt mixtures and concrete mixtures, due to quality control issues.

Similar issues exist in all construction materials, such as cement, concrete, plasters, mortars, and dimensional lumber replacements.

Accordingly, it would be desirable to provide construction materials with any one or more of: greater consistency in resistance to deformation, denting, cracking, and/or moisture over the temperature range that construction materials experience for a variety of different aggregates and/or other base materials.

Also desirable would be construction materials with greater consistency in workability over the range of environmental conditions, such as temperature, moisture, wind, and solar radiance, during application such as pavements or vertical structures such as houses. As an example, typical additives to an asphalt paving mixture to improve rutting resistance include stiffer binders at high temperatures, higher quality aggregates, and fibers, such as cellulose and aramid fibers. Typical additives that may improve moisture resistance include liquid anti-strip additives and hydrated lime. Additives that improve rutting resistance do not consistently improve moisture resistance, and vice versa. In vertical construction, workability of cementitious mixtures is necessary for moving and forming the material into desired forms, so additional water or plasticizers are added to the concrete mixture to increase workability. Depending on the environmental conditions of humidity and temperature, the workability will vary for a given dosage, and frequently a trade-off for improved workability is ultimate strength, which is undesirable for the final product.

Furthermore, it would be desirable to have a composite construction material that is easy to manufacture at a production plant. For example, additives, such as hydrated lime and fibers, require cumbersome procedures or special equipment to implement at asphalt and concrete plants.

Still further, it would be desirable to have a composite construction material that incorporates higher contents of RAM and other recycled construction materials such as recycled glass and wood. Usage of these materials has a strong benefit of recycling materials that are difficult to dispose and reduces requirements to mine, harvest, or source virgin materials, which may be in limited supply, thereby increasing the sustainability of the composite construction material. RAMs have strong economic benefits due to decreased cost of aggregate materials instead of virgin materials. RC reduces the need for virgin aggregates and the expense of disposing of old concrete. RAP and RAS have an additional benefit of including asphalt binder that can be utilized in an asphalt mixture to reduce the amount of virgin or new asphalt binder required for the mixture. Prior art utilization of these recycled materials has been limited to a low percentage of total volume, typically less than 20% of the total asphalt binder mixture, due to the inconsistencies, e.g., gradation and moisture, of these materials.

SUMMARY OF THE INVENTION

The disclosed invention advantageously fills these needs and address the aforementioned deficiencies by providing an additive for construction materials that increases bonding between aggregate, cementitious materials, and RAM without requiring complex processes to incorporate desirable structural polymers into the construction mixture. Moreover, the disclosed invention further provides novel composite construction materials comprising the additive, and methods for making the additive and the composite construction materials comprising the additive.

Accordingly, the present disclosure relates to hybrid additives for use in construction materials. The additives generally comprise pellets formed of a plastic or polymeric material. The additive may further comprise one or more additional materials, such as fibers, pozzolans, nano-carbon tubes, glass, recycled asphalt shingles (RAS), liquid anti-strip, hydrated lime, rejuvenators, cementitious material, and ground tire rubber. These additional materials may be incorporated into the pellets or coated on a surface of the pellets. For example, according to certain aspects, the pellets may be coated with a cementitious material that includes calcium carbonate and pozzolanic materials.

The pellets may comprise dimples, indentations, or inclusions on a surface of the pellet that contain the additional materials, such as a cementitious material.

The plastic or polymeric material of the pellets may be recycled or virgin materials. Exemplary plastic or polymeric materials comprise one or more of high-density polyethylene (HDPE), low density polyethylene (LDPE), polypropylene, polystyrene, polytetrafluoroethylene in compacted, heat-treated, or gas-expanded form.

The pellets may have a length of 3-13 mm, a diameter of 1-13 mm, and an end curvature of 1° to 30° measured as a total deflection from a longitudinal axis thereof. Furthermore, the pellets may have a melting temperature of 95-140° C.

The present disclosure further relates to hybrid construction materials. The hybrid construction materials may be configured as asphalt-based materials, as cementitious materials, or the like.

According to certain aspects, when the hybrid construction material is configured as an asphalt-based construction material, it may comprise 0.5-15 wt. % of an asphalt binder, 0.1 to 10 wt. % of a hybrid additive, and an aggregate, wherein the wt. % is based on a total weight of the hybrid construction material. In certain examples, the aggregate and the hybrid additive may be provided at 85-99.5 wt. % based on a total weight of the hybrid construction material, wherein the hybrid additive is provided at 2-4 wt. %. Moreover, the hybrid additive may be formed as pellets of a plastic or polymeric material as described hereinabove and one or more of fibers, pozzolans, nano-carbon tubes, glass, recycled asphalt shingles (RAS), liquid anti-strip, hydrated lime, rejuvenators, cementitious material, and ground tire rubber.

The asphalt-based construction material may be formed into a flexible paving structure according to a method comprising: heating aggregate to a temperature of 105-400° C. (e.g., to drive off moisture); lowering the temperature of the aggregate to below 175° C.; dry mixing hybrid additive with the aggregate to form a dry mix; adding the dry mix to the heated asphalt binder to form the hybrid construction material; and compacting the hybrid construction material at 85-175° C.

The asphalt-based construction material may be formed into a flexible paving structure according to a method comprising: heating aggregate to a temperature of 105-400° C. (e.g., to drive off moisture); dry mixing hybrid additive and recycled asphalt materials, such as reclaimed asphalt pavement (RAP), with the aggregate to form a dry mix; adding the dry mix to the heated asphalt binder to form the hybrid construction material; and compacting the hybrid construction material at 85-175° C.

When the flexible paving structure is formulated with 2-4 wt. % of the hybrid additive, performance enhancements of the paving structure as compared to a paving structure formed without the hybrid additive are found to include one or more of: reduced rut depth by at least 50% as measured by a Hamburg Tracking Wheel (HWT) test; increased moisture resistance by at least 50% as measured by stripping inflection points (SIP) from a set of HWT tests; increased cracking resistance by approximately 5% as measured by a Disc-shaped Compact Tension (DCT) test; and reduced absorption of the binder into the aggregate by at least 50%.

According to certain aspects, when the hybrid construction material is configured as a cementitious construction material, it may comprise 0.5-30 wt. % of a cementitious binder, 10 to 60 wt. % of a hybrid additive, and an aggregate, wherein the wt. % is based on a total weight of the hybrid construction material. In certain examples, the aggregate and the hybrid additive may be provided at 70-99.5 wt. % based on a total weight of the hybrid construction material, wherein the hybrid additive is provided at 10-40 wt. %. Moreover, the hybrid additive may be formed as pellets of a plastic or polymeric material as described hereinabove that are coated with a cementitious material that includes calcium carbonate and pozzolanic materials.

The cementitious construction material may be formed into a cementitious structure according to a method comprising: dry mixing the cementitious binder, aggregate, and hybrid additive of the hybrid construction material at ambient conditions to form a dry mix; adding sufficient water to the dry mix to form a cementitious slurry that cures to form the cementitious structure.

When the cementitious structure is formulated comprising 10-40 wt. % of the hybrid additive, performance enhancements of the structure as compared to a structure formed without the hybrid additive are found to include one or more of: improved resistance to chemical wear by at least 50%, and improved resistance to mechanical wear by at least 50%, as measured by an L.A. Abrasion test.

BRIEF DESCRIPTION OF THE DRAWINGS

Aspects, features, benefits, and advantages of the embodiments herein will be apparent with regard to the following description, appended claims, and accompanying drawings.

DETAILED DESCRIPTION

Figure 1:
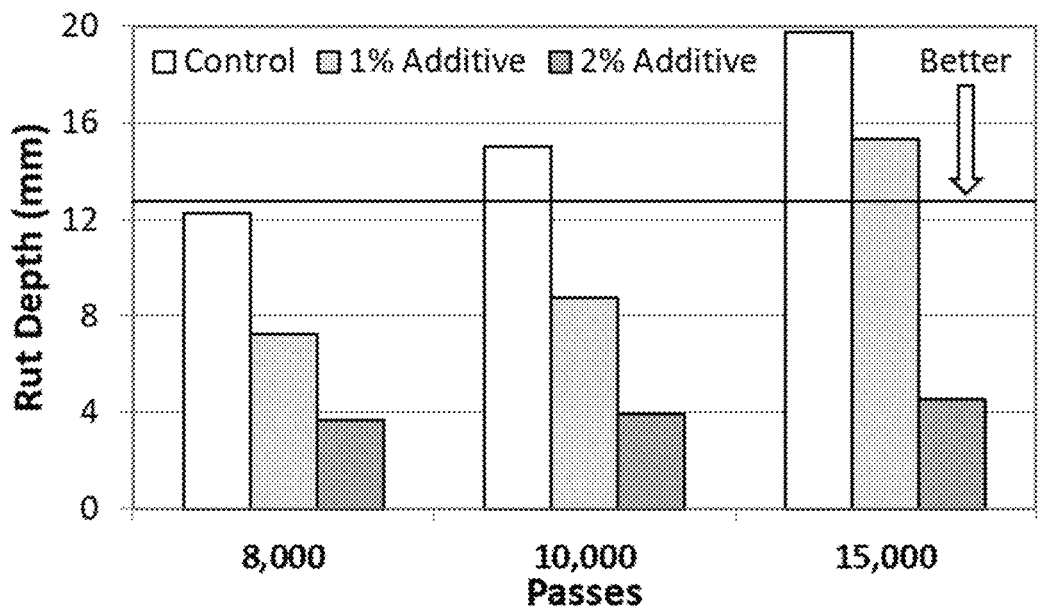
FIG. 1 is a graph showing rutting performance of hybrid composite construction materials (hybrid composite) comprising varied amounts of a hybrid additive according to aspects of the present disclosure when used in flexible paving applications.

The present invention is related to an engineered structural polymer-binder construction material, hereinafter referred to as hybrid additive, that maintains the positive performance aspects of typical asphalt and concrete mixtures, while improving the performance of the mixtures by increasing bonding and strength within the mixture—and therefore increasing useable life and lowering costs. The present invention is further related to hybrid composite construction materials comprising the hybrid additive, hereinafter referred to hybrid composites, and methods of making the hybrid additive and hybrid composites comprising the hybrid additive.

Definitions and Abbreviations

Throughout this description and in the appended claims, use of the singular includes the plural and plural encompasses singular, unless specifically stated otherwise. For example, although reference is made herein to "an" aggregate, "a" composite, and "the" additive, one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the composites detailed herein may also be described as consisting essentially of or consisting of. For example, while the invention has been described in terms of a hybrid composite comprising a hybrid additive, a binder, and one or more aggregates, a hybrid composite material consisting essentially of a hybrid additive, a binder, and one or more aggregates is also within the present scope. In this context, "consisting essentially of" means that any additional components will not materially reduce the strength or durability of the hybrid composite material formed therefrom.

Furthermore, the use of "or" means "and/or" unless specifically stated otherwise. "Including" and like terms means including, but not limited to. When ranges are given, any endpoints of those ranges and/or numbers within those ranges can be combined within the scope of the present invention.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

The term "aggregate" is used herein to denote any hard, inert, typically mineral material that is bound together by a binder. Examples of aggregate used in construction or paving mixtures include marble, limestone, basalt, dolomite, sandstone, granite, and quartzite. RAP, crushed glass, glass beads, and crushed Portland cement concrete (PCC) are also used as aggregate. Furthermore, aggregate can be from natural or manufactured sources. Aggregates can also include manufactured aggregates from intentional heating of materials, such as lightweight aggregates composed of expanded clay and shale, and aggregates that are byproducts of other materials such as slag from production of metals such as slag. Aggregates in paving materials typically range from less than 50 mm (2 inches) to fine dust that passes through the #200 US sieve (75 microns). Any of various known grades of aggregate and gradation can be used in the practice of this invention, including dense graded, uniform graded, gap graded, and open graded used for any type of pavement including highways, bridges, roads, parking lots, recreation trails, sidewalks, sporting facilities, and porous pavements.

The term "binder" is used herein to denote any material that binds, glues, adheres, or bonds aggregates together. Examples of common construction material binders include but are not limited to asphalt binder, made from natural or refined asphalt or a mixture of both sources, tar, Portland cement, cements, pozzolans, epoxies, glues, adhesives, grouts, clays, and hydrated lime that can come in solid, liquid, emulsion, slurry, powder, pelletized, or gaseous form.

The term "hybrid additive" is used herein to denote any material that improves the bonding of the hybrid composites in order to achieve the desired performance properties, such as strength, moisture resistance, resistance to deformation, and cracking resistance. The hybrid additive generally comprises structural engineered polymers from virgin and/or recycled sources, and engineering structural plastics, singularly or in combination, that come from industrial and consumer sources. The polymers can include the following classes of polymers in any combination: elastomers, plastomers, ethylenes, styrenes, or other recycled or virgin polymers.

Aspects of the Present Disclosure

The hybrid additives of the present invention may be used in novel construction materials, such as the hybrid composites disclosed herein, and as additives in standard construction materials. For example, two main uses of the hybrid additives disclosed herein include, but are not limited to, hybrid composite asphalt paving and construction materials and hybrid composite cement/concrete paving and construction materials. The hybrid composites produced therefrom maintain the positive performance aspects of asphalt and concrete paving and construction materials, while improving the performance of the mixtures and end products by increasing bonding strength and in some cases lowering weight within a mixture—and therefore increasing useable life, lowering costs, and enabling new applications heretofore unattainable due to current mix, production, cost, and usage limitations.

Accordingly, disclosed herein is a hybrid additive comprising at least virgin and/or recycled materials from industrial or consumer sources of structural polymers. Also disclosed herein are hybrid composite construction materials comprising the hybrid additive, hereinafter referred to as hybrid composites. Also disclosed herein are methods of forming the hybrid additive, and methods of making the hybrid composites comprising the hybrid additive.

Hybrid Additive

The disclosed hybrid additives generally comprise polymers from virgin and/or recycled sources. Exemplary polymers include elastomers, plastomers, ethylenes, styrenes, or other recycled or virgin polymers. For example, the plastic or polymeric material may be any one or more of high density polyethylene (HDPE), low density polyethylene (LDPE), polypropylene, polystyrene, and polytetrafluoroethylene in compacted, heat-treated, or gas-expanded form.

The hybrid additive may include additional components, such as fibers, pozzolans, nano-carbon tubes, glass, recycled asphalt shingles (RAS), liquid anti-strip, hydrated lime, rejuvenators, cementitious material, ground tire rubber, and the like. These materials may be incorporated into the hybrid additive or as a coating on an exterior surface of the hybrid additive.

The disclosed hybrid additives are unique in that they are structurally different from other known construction materials and additives. More specifically, the form and/or shape of the hybrid additive has been designed to make addition of the additive easier during production of hybrid composites, such as production of a composite material at an asphalt plant or cement/concrete plants. The shape of the additive is designed to allow the additive to be transported easily by different conveyance systems such as pneumatic, pressurized or vacuum, mechanical conveyance systems such as linear continuous conveyances (e.g., belts or augers) or discrete quantity conveyances (e.g., hopper or bucket), or typical mobile mechanized equipment available at asphalt or concrete plants such as front-end loaders, dump trucks, bucket trucks, cranes, forked lifts, and scissor lifts, that are used for transporting aggregates and other bulk goods, such as hydrated lime, cement, and fibers, around an asphalt plant or sand, gravel and cement components at a concrete plant.

In one exemplary implementation, the form of the hybrid additive is roughly cylindrical with a slight curvature at the ends to increase the rolling resistance of the pellet, yet still allow the pellets to flow into/out of bulk quantities. The length of the pellet may be 0.125 inches to 0.5 inches (3 to 13 mm), such as 0.15-0.45 inches, or 0.2-0.4 inches, or 0.2-0.3 inches, or about 0.25 inches (6 mm). The diameter of the pellet may be 0.0625 inches to 0.5 inches (1.5 to 13 mm), such as 0.1-0.4 inches, or 0.125-0.35 inches, or 0.15-0.25 inches, or about 0.188 inch (5 mm). The curvature at the ends of the pellet may be from 1° to 45°, relative to a longitudinal axis of the pellet, such as from 1°-30°, or from 1°-20°, or from 1°-15°, or from 1°-10°. The curvature at each end of the pellet may be in the same direction or may be a deflection from the longitudinal axis in any axial direction. Furthermore, the sizing may be consistent within 10% of the nominal dimension, and ideally within 5%, which improves the flowability of the additive. The surface texture of the hybrid additive is typically smooth but can be adjusted in the manufacturing process to improve the movement of the material.

In another exemplary implementation, the form of the hybrid additive is powderized using any means of reducing the size of the material such as, but not limited to, rolling ball mills, cryogenic mills, crushing, shearing, and/or blowing air into the fabrication. When powderized, a diameter of the hybrid additive may be from about 5 micrometers (um) to 250 um, such as 5-200 um, or 10-150 um, or 25-125 um.

In another exemplary implementation, the hybrid additive is formed into a roughly spherical shape with a nominal diameter ranging from 1/16 to 1/2 inch (1.6 to 13 mm) with preferential sizes of nominally about 3/16 inch (4.8 mm), 3/8 inch (9.5 mm), and 1/2 inch (13 mm), which has a high crush strength due to its geometry. For example, the nominal diameter of the spherical hybrid additive may be 1-20 mm, such as 1-15 mm, or 3-15 mm, or 4-13 mm. The spherical pellet may be filled with air or other additives to improve the composite mixture and these pellets may or may not have a coating on the outside of the pellet. That is, the hybrid additive may be modified by utilizing foaming processes or agents to lighten the additive and to introduce properties that allow increased dispersion in asphalt production and enable production of lightweight concrete and concrete products with insulative properties, or other construction material applications that provide economic or usability benefits from light weight such as high-rise buildings, concrete housing, infrastructure components such as bridge beams, lightweight roof tiles, blocks, panels, pavers, poured cement, and other lightweight concrete or construction materials.

The surface of the hybrid additive, such as when pelletized or provided in a spherical shape, may be textured to increase the surface macro- and micro-textures, and thereby the bonding of the hybrid additive with components of the construction matrix (i.e., components of a composite material disclosed herein). Texture may include indentations, dimples, inclusions, and the like.

The disclosed hybrid additives are also unique in that they may have a melting point optimized for usage in the hybrid composites. For example, when producing a hybrid asphalt composite, the hybrid additives disclosed herein are designed to melt and become part of the overall chemistry of the end material mix. The preferred melting point of the hybrid additive is within the range of 95-140° C. (200-285° F.), with an optimum melting point of 105-115° C. (220-240° F.). This melting point is sufficiently high such that the material does not require specialized storage, such as avoiding direct sunlight or in an air-conditioned space but is sufficiently low to easily melt during asphalt mixture production, even warm-mix asphalt. Furthermore, the melting point is important to ensure thorough, even distribution of the additive through the hybrid asphalt composite during mixing.

According to certain aspects, the hybrid additive may comprise an olefin such as polyethylene and/or polypropylene. For example, the hybrid additive may comprise 0-100% polyethylene, such as 50-95% polyethylene.

The hybrid additive may further include coatings, such as with cementitious material that includes calcium carbonate, hydrated lime, graphene, and pozzolanic materials. These materials may be included at from 0 wt. % to 50 wt. % of the total weight of the pellet, such as at least 0.1, 0.5, 1, 2, 3, 4, 5, 6, 7, 8, 9, 10 wt. %, or up to 20, 25, 30, 35, 40, 45, or 50 wt. %, based on the total weight of the pellet. The coatings may be included on an external surface of the pellet in a range comprising any combination of lower and upper limits indicated herein, such as from 0 wt. % to 40 wt. %, or from 0.1 wt. % to 20 wt. %, or 0.1 wt. % to 30 wt. %, or from 0.1 wt. % to 5 wt. %, etc.

The hybrid additive may further include additional components incorporated into the pelletized or spherical structure, such as fibers, pozzolans, nano-carbon tubes, glass, recycled asphalt shingles (RAS), liquid anti-strip, calcium carbonate, hydrated lime, graphene, rejuvenators, cementitious material, and ground tire rubber. These materials may be included at from 1 wt. % to 100 wt. % of the total weight of the pellet, such as at least 1, 2, 3, 4, 5, 6, 7, 8, 9, 10 wt. %, or up to 20, 25, 30, 35, 40, 45, or 50 wt. %, based on the total weight of the pellet. The additional materials may be coated on the pellet or included in the pellet in a range comprising any combination of lower and upper limits indicated herein, such as from 0 wt. % to 40 wt. %, or from 0.1 wt. % to 20 wt. %, or 0.1 wt. % to 30 wt. %, or from 0.1 wt. % to 5 wt. %, etc.

The hybrid additive is also ultraviolet light (UV) resistant, which means the material fades in color less than typical construction materials. This is beneficial for many applications. One application is asphalt pavements that stay darker longer, which can provide a safety benefit of the ability to distinguish the painted strips from the pavement in the dark or rainy conditions. Another application is prefabricated elements that do not fade as quickly as current materials in sunlight.

When included in an asphalt construction material, the additive may provide performance enhancements such as reduced rutting, increased strength, and reduced moisture sensitivity. When included in a concrete or cementitious construction material, the additive may provide performance enhancements such as increases in the insulation value, reduction in the variability of surface water and the absorption of water, improved resistance to salts and minerals, and increased durability.

Hybrid Composite

Also disclosed herein are hybrid composites generally comprising an aggregate, a binder, the hybrid additive, and optionally, additional additives. The dry components are introduced through a unique dry process during production of the hybrid composite, wherein the dry components including the aggregate, binder, and hybrid additive are blended to produce the hybrid composite paving material. In the application of a hybrid additive to an asphalt mixture, the additive is generally not blended into the binder before the binder is mixed with the aggregate.

Exemplary aggregates include naturally occurring or manufactured aggregate, sand, screenings, dust, or aggregates known to be used in paving and construction materials by those skilled in the art.

Exemplary binders include asphalt, tar, pozzolans (generally, but not limited to, aluminosilicate materials mixed with calcined lime), Portland cement, supplementary cementitious materials, hydrated lime, asphaltite, calcium carbonate, epoxies, clays, including virgin or recycled/reclaimed sources or both, in dry, slurry, emulsion, liquid, or gaseous form. Further exemplary binders include asphalt binder, crushed asphalt pavement, concrete products, asphalt shingles, glass, natural and synthetic rubber, and/or wood. Each of the binders disclosed herein may include virgin sourced materials, recycled/reclaimed materials, or a combination of both.

Exemplary optional additives used in paving mixtures known to those skilled in the art may include, but are not limited to, (a) liquid anti-strip additives, such as an amine-based or organosilane-based additives, or hydrated lime (calcium hydroxide); (b) fibers, including cellulose, aramid, steel, glass, fiberglass, polymeric, and carbon; (c) warm-mix additives that modify production and/or paving temperature of a paving mixture, including waxes, chemical, and steam treatments; (d) additives that improve workability of the paving mixture, such as plasticizers, water-reducing admixtures, waxes, such as Sasobit; and (e) additives that improve binder coating of the aggregate, such as surfactants, soaps, and waxes.

Exemplary optional additives further include additives that modify the binder, including (a) polymers to improve elasticity of the mixture, such as elastomers, reactive elastomeric terpolymer, styrene-butadiene-styrene (SBS) polymers, and styrene-butadiene rubber (SBR) copolymers; (b) ground tire rubber or other rubber compounds; (c) materials to increase the light oil fraction, e.g., maltene matrix, in asphalt binders, including additives based on oils from plants, such as soy, canola, sunflower, coconut oil, tall oil, and additives from refined processes such as virgin oils or reclaimed engine oil bottoms (REOB); and (d) acids including polyphosphoric acid.

Exemplary optional additives further include graphene, carbon nanotubes, and/or other engineered or naturally occurring organic or inorganic structural composites.

A hybrid composite for use as an asphalt paving material may comprise the following components: aggregates; asphalt binder and/or SBR- and SBS-modified asphalt binder; RAP; and the hybrid additive. As example in an asphalt application, these components are connected as follows: the aggregate; RAP; SBS and SBR polymer-modified asphalt binder; and a hybrid additive such as a pelletized agglomeration of polyolefin polymers, including polyethylene and polypropylene polymers, cementitious materials such as pozzolans, nano-carbon tubes, glass, RAS, and/or other structural materials such as ground tire rubber and graphene. The hybrid additive may further comprise additional materials such as liquid anti-strip, hydrated lime, and/or asphalt rejuvenators.

The components of the hybrid asphalt composite are mixed at an elevated temperature of at least 85° C. (176° F.) but less than 400° C. (750° F.) until uniform coating is achieved.

It should further be noted that the following components in the hybrid additive can be incorporated into the hybrid asphalt composite without being contained in the hybrid additive itself, or in addition to any amounts that are contained in the hybrid additive. For example, each of pozzolans, nano-carbon tubes, glass, RAS, liquid anti-strip, hydrated lime, rejuvenators, and ground tire rubber may be incorporated into the hybrid asphalt composite separate from the hybrid additive. The RAS, pozzolans, nano-carbon tubes, glass, and hydrated lime must be sufficiently dry to allow the material to flow through the material handling process and prevent adding additional moisture to the hybrid asphalt composite during mixing.

The RAS is generally dried to less than 2% moisture using a typical drying system that keeps the RAS below 200° C. to prevent excessive aging of the RAS. The rejuvenator may need sufficient time to react with the RAS incorporated into the hybrid additive based on the recommendations of the rejuvenator manufacturer. Furthermore, the hybrid additive may be introduced into the asphalt mixing process when the temperature is within this temperature range (105-180° C.). To achieve this temperature range, the hybrid additive may be introduced after the aggregate has been heated for mixing. The hybrid additive may be introduced at an intermediate stage in the mixing process with the binder or through a portal, such as a RAP, fiber, or baghouse fines port.

According to additional aspects of the present disclosure, a hybrid composite for use as a cementitious construction material, i.e., hybrid cementitious composite, may comprise aggregate; cement; secondary cementitious materials, such as fly ash, bottom ash, pozzolans, silica fume, and calcined clays; a hybrid additive comprising a blend of structural polymers, in a preferred embodiment of expanded form, that are coated with cementitious material that includes calcium carbonate and pozzolanic materials; and water.

For this hybrid cementitious composite blend, the temperature is not elevated beyond ambient temperature. The surface of the pellet of the hybrid additive may be intentionally textured to increase the surface macro- and micro-textures, and thereby the bonding of the hybrid additive with the cement matrix that develops within the construction composite. Furthermore, the pelletized hybrid additive may contain dimples, indentations, inclusions on the surface thereof, and these indentations may contain cementitious material. The additional cementitious material provides additional material to promote bonding between the hybrid additive pellet and the cement paste.

The primary strength of the hybrid cementitious composite is developed through the pozzolanic reaction. The structural polymers of the hybrid additive provide additional strength through increased cementitious material and a surface that is sealed and does not absorb moisture during the curing process to improve the long-term hydration reaction at the pellet-cement matrix interface. In addition, the blend of structural polymers of the hybrid additive may include fibers, that include but are not limited to aramid, steel, cellulose, hemp, and carpet fibers, and glass in a variety of forms including but not limited to pelletized, crushed, and powdered forms, to improve the strength and cracking resistance of concrete mixtures. The fibers may be incorporated into the blend during production of the hybrid additive in a pelletized form. Incorporating the fibers into the pellet improves material handling of fibers because the pellets have sufficient density that they can be easily introduced into the composite mixture without blowing away.

Another benefit of fibers contained in a hybrid additive that can easily be mixed into and dispersed within a cement composite mixture is the dispersed fibers strengthen and create additional bonds between the interface of the hybrid additive pellets and the cement matrix that improve the resistance to cracking of the concrete composite.

Additional applications of the hybrid composites disclosed herein include a variety of applications in which the construction or paving material is prefabricated or pre-formed. The pre-formed applications can be manufactured and formed into desired shapes by known manufacturing methods including but not limited to heating, molding, extruding, rolling, stamping, casting, machining, water-jet or laser cutting, additive manufacturing, or other manufacturing processes utilized to form, mold, or manufacture components using the invention to create end-use construction materials and/or components. The components can be pre-formed in a manufacturing facility, on-site, or in-situ. The prefabricated components can be auxiliary applications to paving including curbs, corners, roundabouts, driveways, sidewalks.

The prefabricated components can be part of a process that uses prefabricated components to quickly install and build common pavements, such as sidewalks, parking lots, and driveways, with standardized pieces that can be installed without specialized paving equipment. The pieces can be interlocking or placed beside or near each other and the gap between pieces can be filled with aggregate or fillers used to fill joints, cracks, or gaps in pavements including but not limited to crack sealants, asphalt mixtures, and expansion joint materials.

For vertical construction, the hybrid composite can be formed on-site or prefabricated into components including blocks (hollow or solid), wall, panels, beams, frames, conduits, pipes, doors, piers, footings, pilings, floors, flooring, tiles, shingles, pavers. The hybrid composite can be applied to or inserted between other surfaces using techniques such as spraying, troweling, texturing, stuccoing, mud jacking, and grouting in vertical construction and geotechnical applications to achieve one or more of the following purposes: coat, texture, decorate, waterproof, finish, and/or fill. This application of the hybrid composite increases speed of construction and reduces the labor required for these applications.

The disclosed hybrid composites are unique when compared with other known construction materials because they demonstrate significant improvements in all aspects of standard construction material performance, e.g., asphalt, concrete, etc. For example, bonding of mixture components, rutting/denting/deformation resistance, cracking resistance, and moisture resistance are all improved for the presently disclosed hybrid composites when compared to standard materials.

Addition of the presently disclosed hybrid additives to standard construction materials such as asphalt or concrete, or exchange of amounts of standard materials in concrete or asphalt for the hybrid additives, renders these standard materials far improved across a range of standard performance metrics. That is, the hybrid additive improves many of the performance parameters and benefits of other high tensile and compressive strength materials, such as fibers. For example, and as discussed in more detail in the examples section of this disclosure, the hybrid additive provides significant increases in performance of hybrid composites over conventional asphalt or prior polymer modified asphalts in all key aspects of material performance and therefore can lower costs and/or allow additional uses beyond the capabilities of currently available mixes or additives.

Areas of increased performance of the hybrid composites comprising the hybrid additives include at least increased strength, rutting resistance, moisture resistance, and cracking resistance. Without wishing to be bound by one theory, the increased performance likely originates from increased bonding as a result of inclusion of the hybrid additive, i.e., structural polymers of the hybrid additive increased bonding between different sources of aggregate and binder. A clear advantage of the present hybrid additive is that the increased performance is achievable by methods that do not require specialized equipment to implement at the material production facility.

Improved performance is also observed as consistent increases in paving mixture stiffness, e.g., asphalt stiffness, without requiring polymer modification of the binder by the producer but instead allowing modification at the production plant by the producer. That is, the producer may include the hybrid additive during production of the paving composition at the plant. This obviates the need for the producer to source specialized asphalt and/or aggregates. Moreover, the hybrid additive provides for increased RAM content, up to 100%, with better bonding and without the complications of material inconsistency, e.g., provides superior material consistency.

The hybrid additive further provides tunable and scalable performance behavior of the hybrid composite (strength, rutting, stripping, tensile/compressive strength, temperature performance, moldability, etc.) that increases linearly as the amount of hybrid additive increases. Not only are performance characteristics improved, but the consistency of test performance data for rutting, cracking (fatigue, thermal, reflective, shrinkage) is improved. Moreover, the present inventors have found that the improved performance may occur by increasing the effective binder content on the surface of the aggregate and decreasing the absorption of the binder into the aggregate.

The hybrid additive may perform as an anti-strip additive in the hybrid composites, such as asphalt mixtures used for paving. Antistrip additives are commonly used by many highway agencies to improve the water resistance of asphalt concrete mixtures. Moreover, the hybrid additive may provide anti-strip properties to fiber additives that are used to increase strength in such paving composites.

The hybrid additives may also be useful in construction materials in which the material is prefabricated or preformed into auxiliary components including but not limited to curbs, corners, roundabouts, pavers, bricks, roof tiles or shingles, siding, dimensional lumber alternatives, roads, airport landing strips, bridge components, modular building units, beams, trusses, or other residential, commercial, or government/military applications.

As mentioned hereinabove, the disclosed hybrid additives may act as a polymerized anti-strip additive in asphalt mixes. The hybrid additive improves bonding between the aggregate and binder by bridging the stiff and fluid components of the asphalt binder and creating links to and between the binder and aggregate. The improved bonding increases the moisture resistance of the asphalt mixture, as demonstrated by the increased stripping inflection point (SIP) of the Hamburg Wheel Tracker test (AASHTO T 324). The SIP is the intersection of two behaviors during the test: the creeping behavior, a gradual deformation of the mixture, and the stripping behavior, a rapid deformation that signifies the mixture has lost its internal stability due to moisture and composition. A large SIP is desirable because it means more passes of a loaded wheel are needed before the mixture becomes unstable.

The hybrid additives may improve the bonding within a cement mixture by improving the bonding between the aggregate and cement paste. The spherical pellets may have a texture that increases the surface area and increases the wettability of the pellets that allows the development of a strong interface between the additive and cement paste.

The hybrid additives are unique in that they may be added in a dry mix process to produce the hybrid composite material, such as an asphalt, concrete, or construction composite. This ability gives the material producer greater control over the product produced and allows more precisely engineered materials because the hybrid additive dosage can be varied to meet the strength and deformation, cracking, and moisture resistance requirements of the mixture without negatively influencing other desirable mixture performance, such as a trade-off of decreased cracking resistance for increased rutting resistance. Previous attempts to use the dry process have had limited success because of issues with consistency. The consistency of the hybrid additive in both material components and dimensions creates a new level of consistency of the mixture, which is born out through laboratory and field testing detailed in the examples disclosed herein.

The hybrid additives disclosed herein have been found to exhibit linear effects on performance characteristics. As example, a 1% addition of the hybrid additive to an asphalt mix produces significant gains in the performance parameters, and further additions, such as 2% and 3% demonstrate expected linear increases in the measured performance characteristic. This linear predictable improvement allows users to easily achieve any desired performance of the resultant hybrid composite with a consistently not available with prior asphalt or modified asphalt mixes, or with concrete mixtures.

The hybrid additives has been found to provide chemical bonds within the hybrid composite upon cure, e.g., exposure to elevated temperatures of at least 95° C. (200° F.). Moreover, the amount of the hybrid additive required to affect such binding is low. The low usage amount required to achieve a desired performance metric is typically 1-5% wt. % of total binder weight. Accordingly, the presently disclosed hybrid additives provide an economical and in many cases cost-saving results while minimizing the volume of material needed to achieve the target performance. This can allow the user to eliminate other additives and to utilize lower-grade, lower cost materials to achieve desired performance such as asphalt binder oils in asphalt and lower cost aggregates and cement ingredients in concrete—allowing higher profits to the producer and lower costs to the user for equivalent or higher performance compared to alternative materials or additives.

While the hybrid additives provide performance improvements at low usage amounts, the hybrid additive also provide significant improvements in hybrid composites at high volume amounts. That is, the hybrid additive may be included in hybrid composites as an additive and/or as a replacement for aggregate materials at from 0.01% to 100% by weight of volume without decreasing the strength of the construction material. As the percentage of aggregate replacement increases, the unit weight of the composite material decreases, which is beneficial for reducing the weight and thereby the supporting elements for a structure formed with the hybrid composite.

The present inventors have found that the hybrid additive bonds with and encapsulates other components of a composite construction material, such as the hybrid composites disclosed herein, which prevents materials from wearing off due to abrasion or weathering. The additional bonding prevents particles such as microplastics, ground tire rubber, and fine aggregates from wearing off the surface of the construction mixture and migrating into environmentally sensitive places such as waterways, wetlands, and drinking water sources.

Moreover, the hybrid additive reduces the absorption of the binder into the aggregate, which is a common problem of construction materials. Binder that is absorbed into the aggregate is not available on the surface to improve adhesion between aggregate particles, which negatively affects the economics and performance of the mixture. Furthermore, binder can selectively absorb into an aggregate, which means more desirable components of the binder absorb while less desirable components remain on the surface of the aggregate. In asphalt mixtures, the softer flexible components of asphalt binder may absorb more than the harder, more brittle, and aging-prone components, which remain on the surface of the aggregate; this process results in poor performance of the mixture.

The following aspects are provided in the present disclosure:

Aspect 1: A hybrid additive for use in construction materials, the additive comprising: pellets formed of a plastic or polymeric material.

Aspect 2: The hybrid additive according to any preceding aspect, comprising one or more additional materials, such as fibers, pozzolans, nano-carbon tubes, glass, recycled asphalt shingles (RAS), liquid anti-strip, hydrated lime, graphene, calcium carbonate, rejuvenators, cementitious material, and ground tire rubber.

Aspect 3: The hybrid additive according to aspect 2, wherein the additional materials are incorporated into the pellets or coated on a surface of the pellets.

Aspect 4: The hybrid additive according to any preceding aspect, wherein the pellets may be coated with a cementitious material that includes calcium carbonate, graphene, hydrated lime, and pozzolanic materials.

Aspect 5: The hybrid additive according to any preceding aspect, wherein the pellets comprise dimples, indentations, or inclusions on a surface of the pellet that contain the additional materials, such as a cementitious material.

Aspect 6: The hybrid additive according to any preceding aspect, wherein the plastic or polymeric materials of the pellets may be recycled or virgin materials.

Aspect 7: The hybrid additive according to any preceding aspect, wherein the plastic or polymeric materials of the pellets comprise one or more of high-density polyethylene (HDPE), low density polyethylene (LDPE), polypropylene, polystyrene, polytetrafluoroethylene in compacted, heat-treated, or gas-expanded form.

Aspect 8: The hybrid additive according to any preceding aspect, wherein the pellets have any or all of: a length of 3-13 mm, a diameter of 1-13 mm, an end curvature of 1° to 30° measured as a total deflection from a longitudinal axis thereof, and a melting temperature of 95-140° C.

Aspect 9: A hybrid construction material comprising a binder, an aggregate, and a hybrid additives according to any of aspects 1 to 8.

Aspect 10: The hybrid construction material according to aspect 9, wherein the material is configured as an asphalt-based material or a cementitious material.

Aspect 11: The hybrid construction material according to aspect 10, wherein the material is configured as an asphalt-based material comprising 0.5-15 wt. % of an asphalt binder, 0.1 to 10 wt. % of a hybrid additive, and an aggregate, wherein the wt. % is based on a total weight of the hybrid construction material.

Aspect 12: The hybrid construction material according to aspects 10 or 11, wherein the aggregate and the hybrid additive are provided at 85-99.5 wt. % based on a total weight of the hybrid construction material.

Aspect 13: The hybrid construction material according to any one of aspects 10 to 12, wherein the hybrid additive is provided at 2-4 wt. %.

Aspect 14: A flexible paving structure formed according to a method comprising: heating aggregate to a temperature of 105-400° C. (e.g., to drive off moisture); lowering the temperature of the aggregate to below 175° C.; dry mixing hybrid additive with the aggregate to form a dry mix, wherein the hybrid additive is according to any one of aspects 1 to 8; adding the dry mix to the heated asphalt binder to form the hybrid construction material; and compacting the hybrid construction material at 85-175° C. to form the flexible paving structure.

Aspect 15: A flexible paving structure formed according to a method comprising: heating aggregate to a temperature of 105-400° C. (e.g., to drive off moisture); dry mixing hybrid additive and recycled asphalt materials, such as reclaimed asphalt pavement (RAP), with the aggregate to form a dry mix, wherein the hybrid additive is according to any one of aspects 1 to 8; adding the dry mix to the heated asphalt binder to form the hybrid construction material; and compacting the hybrid construction material at 85-175° C.

Aspect 16: A flexible paving structure comprising the hybrid construction material according to any one of aspects 9 to 13.

Aspect 17: The flexible paving structure according to any one of aspects 14 to 16, comprising 2-4 wt. % of the hybrid additive, wherein performance enhancements of the paving structure as compared to a paving structure formed without the hybrid additive are found to include one or more of: reduced rut depth by at least 50% as measured by a Hamburg Tracking Wheel (HWT) test; increased moisture resistance by at least 50% as measured by stripping inflection points (SIP) from a set of HWT tests; increased cracking resistance by approximately 5% as measured by a Disc-shaped Compact Tension (DCT) test; and reduced absorption of the binder into the aggregate by at least 50%.

Aspect 18: The hybrid construction material according to aspect 10, wherein the material is configured as a cementitious construction material comprising 0.5-30 wt. % of a cementitious binder, 10 to 60 wt. % of a hybrid additive, and an aggregate, wherein the wt. % is based on a total weight of the hybrid construction material.

Aspect 19: The hybrid construction material according to aspect 18, wherein the aggregate and the hybrid additive are provided at 70-99.5 wt. % based on a total weight of the hybrid construction material.

Aspect 20: The hybrid construction material according to aspect 18 or 19, wherein the hybrid additive is provided at 10-40 wt. %.

Aspect 21: A cementitious structure formed according to a method comprising: dry mixing the cementitious binder, aggregate, and hybrid additive of the hybrid construction material according to any on of aspects 18 to 20 at ambient conditions to form a dry mix; adding water to the dry mix (e.g., adding sufficient water to the dry mix to form a cementitious slurry that cures to form the cementitious structure).

Aspect 22: A cementitious structure comprising the hybrid construction material according to any one of aspects 18 to 20.

Aspect 23: The cementitious structure according to aspects 21 or 22, comprising 10-40 wt. % of the hybrid additive, wherein performance enhancements of the structure as compared to a structure formed without the hybrid additive are found to include one or more of: improved resistance to chemical wear by at least 50%, and improved resistance to mechanical wear by at least 50%, as measured by an L.A. Abrasion test.

This disclosure will now provide a more detailed and specific description that will refer to the accompanying experimental examples. The drawings and specific descriptions of the drawings, as well as any specific or alternative embodiments discussed, are intended to be read in conjunction with the entirety of this disclosure. The hybrid additives and hybrid composites comprising the disclosed additives exhibit performance gains in an asphalt and concrete mix examples. The invention may, however, be embodied in many different forms such as lumber and other applications and should not be construed as being limited to the embodiments set forth herein; rather, these embodiments are provided by way of illustration only and so that this disclosure will be thorough, complete, and fully convey understanding to those skilled in the art.

EXAMPLES

Example 1: Hybrid Asphalt Composites Comprising the Hybrid Additive

Hybrid additive according to the present disclosure was included in a typical asphalt pavement mixture. In FIG. 1, the results from Hamburg Wheel tracking (HWT, AASHTO T 324) tests are shown for a typical asphalt pavement mixture. The HWT test is used to evaluate rutting resistance of asphalt mixtures wherein a smaller rutting resistance number represents better performance.

In FIG. 1, a line is drawn at a rut depth (vertical axis) of 12.5 mm, which is the failure criterion. The control mixture fails between 8,000 and 10,000 passes. Addition of 1% of the presently disclosed hybrid additive (mixture the same as the control with addition of 1 wt. % based on total weight of the composition) improves the rutting resistance and cuts the rut depth by approximately 50%. Addition of 2% additive further improves the rutting resistance by reducing the 1% rut depth by an additional 50%. The 2% additive substantially increases the rutting resistance to the point that no rutting occurs. Additional testing has been performed with up to 10% hybrid additive and a linear increase in performance is observed. The results show that the percentages of the hybrid additive to the hybrid composite can be adjusted to achieve the desired performance. This ability to easily modify the performance is important because pavements and materials are designed and engineered to meet the traffic and environmental requirements, such as temperature and moisture, for a given location.

Figure 2:
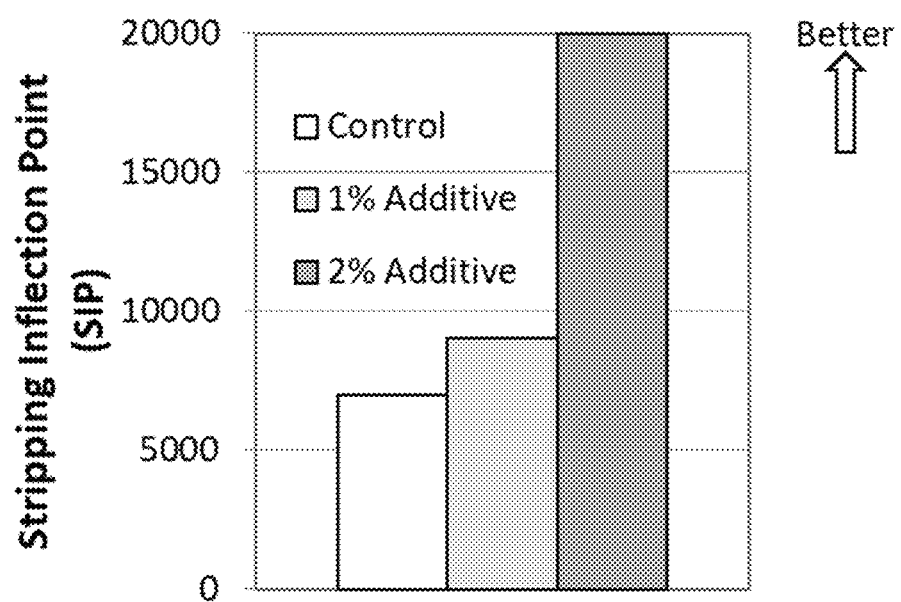
FIG. 2 is a graph showing moisture resistance performance of hybrid composites comprising varied amounts of a hybrid additive according to aspects of the present disclosure when used in flexible paving applications.

In FIG. 2, the stripping inflection points (SIP) from a set of HWT tests are shown. The stripping inflection point is a transition point in HWT testing in which the mixture transitions from slow, steady rutting or deformation to rapid rutting of deformation. Furthermore, the HWT test is performed with the specimens submerged in hot water (generally around 50° C. (122° F.) water). Therefore, the SIP indicates when moisture and heat cause the mixture to become unstable and lose its rutting resistance. An increased SIP is desirable because it indicates the mixture is stable and moisture resistant.

In FIG. 2, the SIP is shown to increase with addition of 1% and 2% hybrid additive in comparison to the control mixture (wt. % based on total weight of the composition). The SIP significantly increases for the 2% hybrid additive to 20,000 passes, which is the end of the test, signifying that the SIP or point of instability never occurred during this test. These results show that the hybrid composite asphalt mixture has greatly improved moisture resistance when the structural polymers are included in the mixture. This also shows that the hybrid additive can be used to replace common anti-strip additives such as liquid anti-strip and hydrated lime.

Figure 3A:
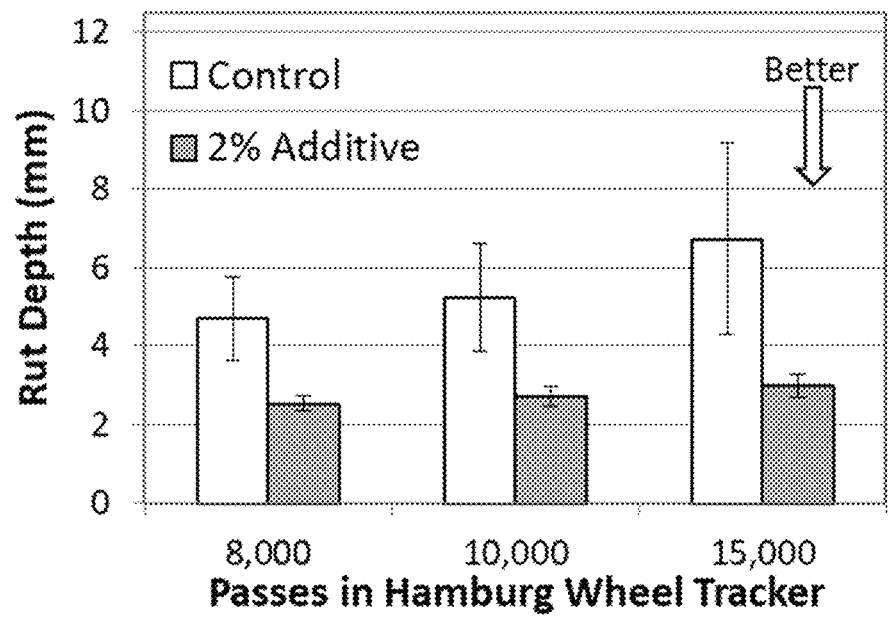
FIGS. 3A and 3B are graphs showing variability of rutting performance of a hybrid composite according to aspects of the present disclosure when used in flexible paving applications.
Figure 3B:
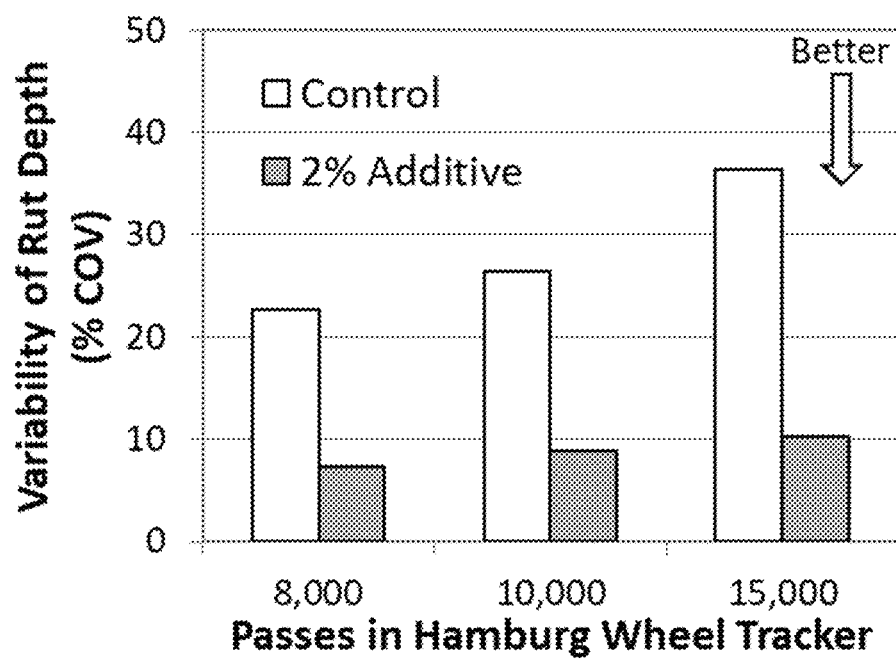

In FIGS. 3A and 3B, HWT test results from another asphalt mixture are shown. In FIG. 3A, the rutting results show that the hybrid additive at a dosage of 2% decreases the rut depth by approximately 50% at 8,000 passes compared to the control mixture, and the percentage increase in rutting resistance increases as the number of passes increases. In FIG. 3B, the variability of the results in FIG. 3A are shown. The variability is measured is terms of the coefficient of variation (COV), which is the standard deviation divided by the average multiplied by 100. The COV for the control mixture is greater than 20% at 8,000 passes and increases to 35% at 15,000 passes. Generally, a COV of less than 10% is considered good when testing asphalt mixtures due to the inherent heterogeneity of asphalt mixtures. The mixture with 2% hybrid additive reduces the COV below this threshold. This result shows that the hybrid asphalt composite mixture is more consistent than a standard asphalt mixture. Consistency is important because more consistency means the producer has better control when producing the hybrid composite, the product is more consistently performs as desired, and owners, such as federal, state, county, and city agencies and property owners such as shopping centers and distribution centers, can specify and receive more consistent products.

Figure 4A:
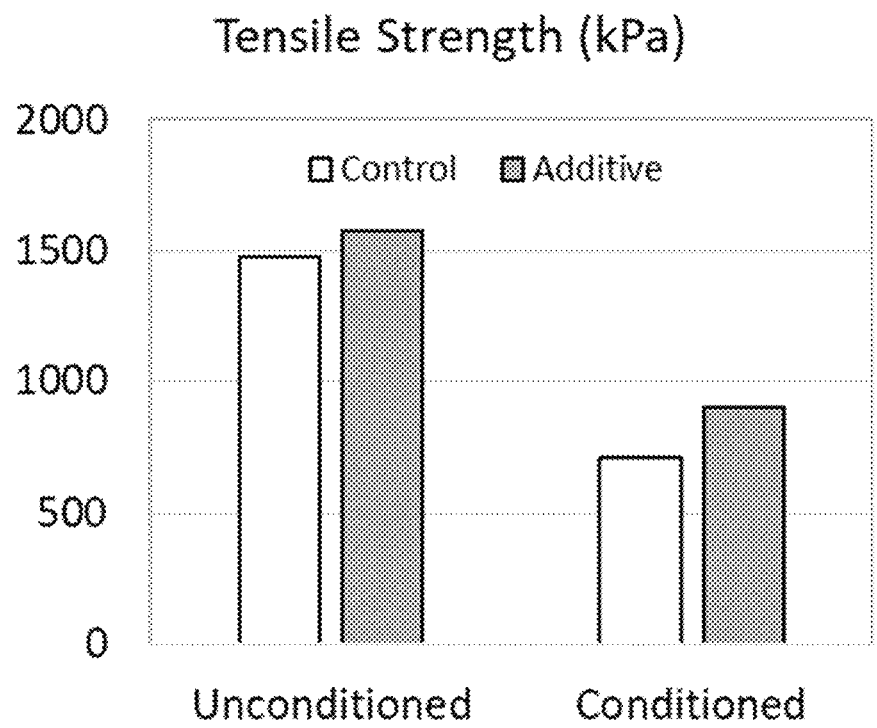
FIGS. 4A and 4B are graphs showing strength performance and performance variability of a hybrid composite according to aspects of the present disclosure when used in flexible paving applications.
Figure 4B:
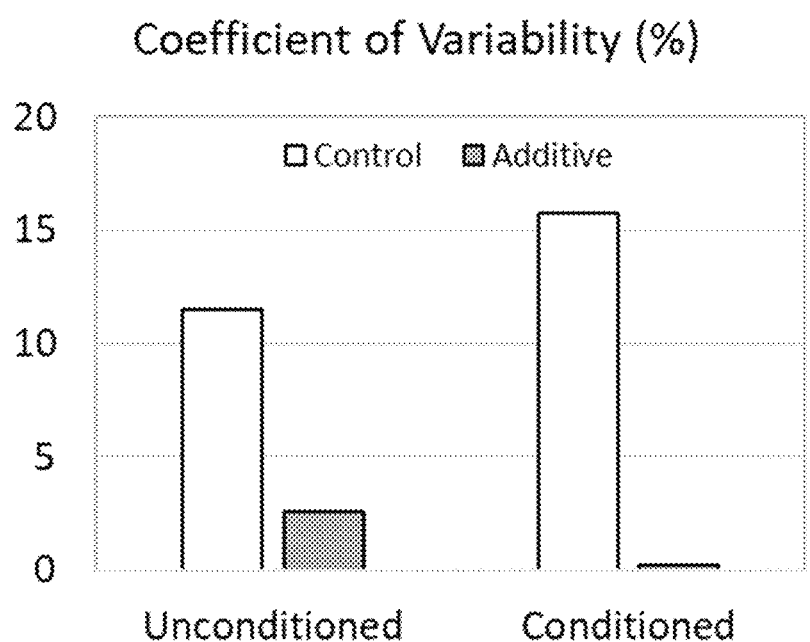

In FIGS. 4A and 4B, the tensile strength results are shown. Tensile strength is a common measurement of strength and an indicator of stiffness of asphalt mixtures. Tensile strength testing is commonly performed to evaluate the moisture resistance of asphalt paving mixtures by comparing the strength of unconditioned vs moisture conditioned specimens following the procedures in AASHTO T 283. The AASHTO T 283 method the change of diametral tensile strength resulting from the effects of water saturation and accelerated water conditioning with a freeze-thaw cycle.

The results in FIG. 4A show the tensile strength for both conditioned and unconditioned specimens. In both cases, including the hybrid additive increased the tensile strength. Increased strength is beneficial because it means a pavement can resist more load for a given thickness or be built thinner for a given level of traffic. The strength increase was larger for the conditioned specimens than the unconditioned specimens, which means the additive increases the moisture resistance as well as increases the overall strength. The results in FIG. 4B show the decreased variability of the test results. Like FIG. 3B, the control mixture had variabilities above 10%, but after including the additive, the variabilities decrease to less than 5%, which is very good for asphalt mixture testing.

Figure 5:
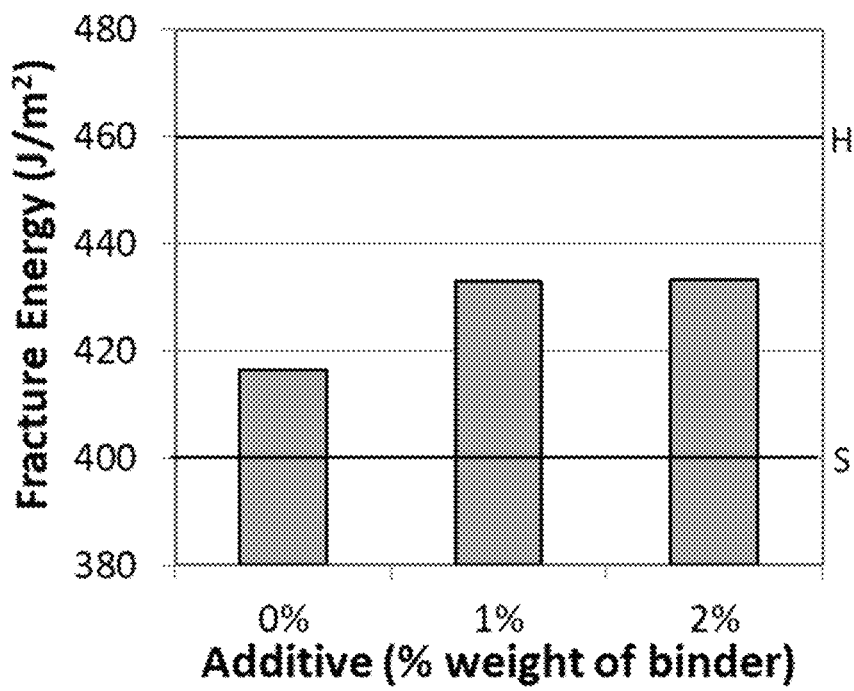
FIG. 5 is a graph showing low temperature cracking performance of hybrid composites comprising varied amounts of a hybrid additive according to aspects of the present disclosure when used in flexible paving applications.

In FIG. 5, the fracture energy results from the Disc-shaped Compact Tension (DCT) test are shown. The DCT test is a test used to measure the low temperature cracking performance of asphalt mixtures. The test measures the energy it takes to crack a specimen. A higher fracture energy means it takes to more effort to crack a specimen and thereby the mixture is more resistant to cracking. The results show that the hybrid composite with the additive increased the cracking resistance by approximately 5%. This is significant, because many other additives included in asphalt mixtures tend to improve the rutting resistance at high temperatures to the detriment of the low temperature cracking because the additives create stiff, brittle mixtures. Conversely, other additives soften the mixture to improve low temperature performance, which causes excessive rutting at high temperatures.

Figure 6:
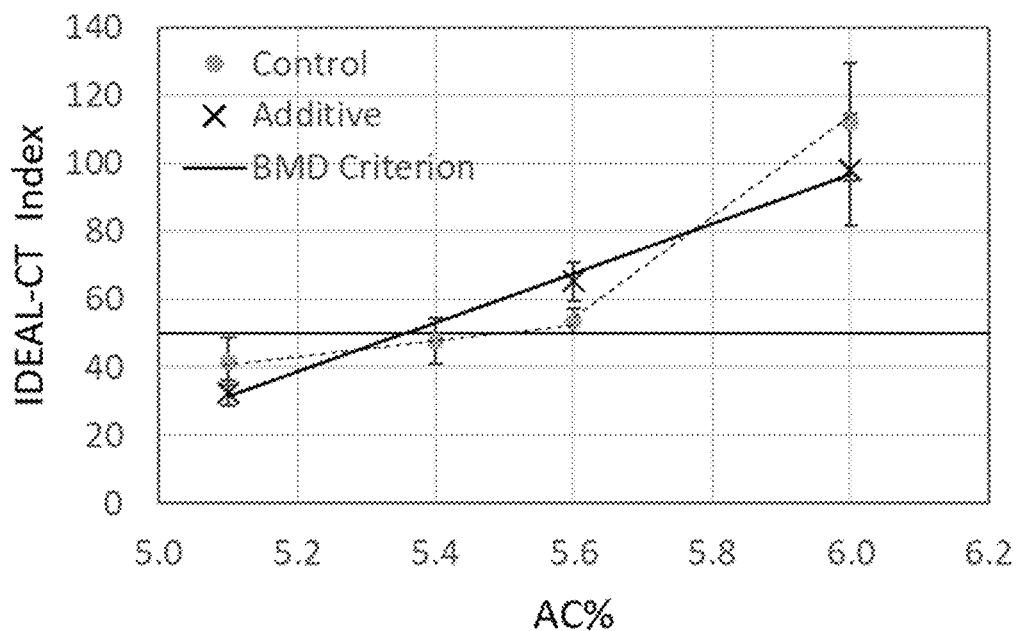
FIG. 6 is a graph showing intermediate temperature cracking performance of a hybrid composite comprising the hybrid additive according to the present disclosure, wherein the data is based on the IDEAL-CT Index.

In FIG. 6, the results from the Indirect Tensile Asphalt Cracking Test (IDEAL-CT) test are shown for different asphalt binder contents. The IDEAL-CT is an index test used to estimate the intermediate temperature (average yearly temperature, near room temperature) cracking performance of asphalt mixtures. The test measures the energy or effort it takes to crack a specimen and the rate the specimen cracks after the maximum load to calculate an index value. A higher IDEAL-CT index is desirable because it indicates a good balance between strength (the effort required to crack a specimen) and toughness (how quickly the specimen cracks). The IDEAL-CT index values were determined for different asphalt contents ranging from 5.1 to 6.0%. In this balanced mix design (BMD), the required IDEAL-CT index is at least 50. The control mixture was unable to meet the index threshold at 5.4%, which is the volumetric optimum asphalt content, so the asphalt content was increased to 5.6% for the control mixture. The results show that the hybrid composite with the additive increased the cracking resistance in a linear, predictable fashion, unlike the control mixture. The mixture with the hybrid additive could have passed at the volumetric optimum (5.4%) based on the linear trend.

One reason the mixture with the additive could have an optimum asphalt content 0.2 percentage points lower, which is a significant cost savings, is the hybrid additive improves the bonding between the aggregate and binder while coating the aggregate and making it less absorptive. When less asphalt binder is absorbed into the aggregate, the effective or free asphalt binder can resist cracking. The results show that the hybrid composite with the additive increased the cracking resistance in the IDEAL-CT by approximately 20% (from 54 to 65), which is a significant increase.

Figure 7:
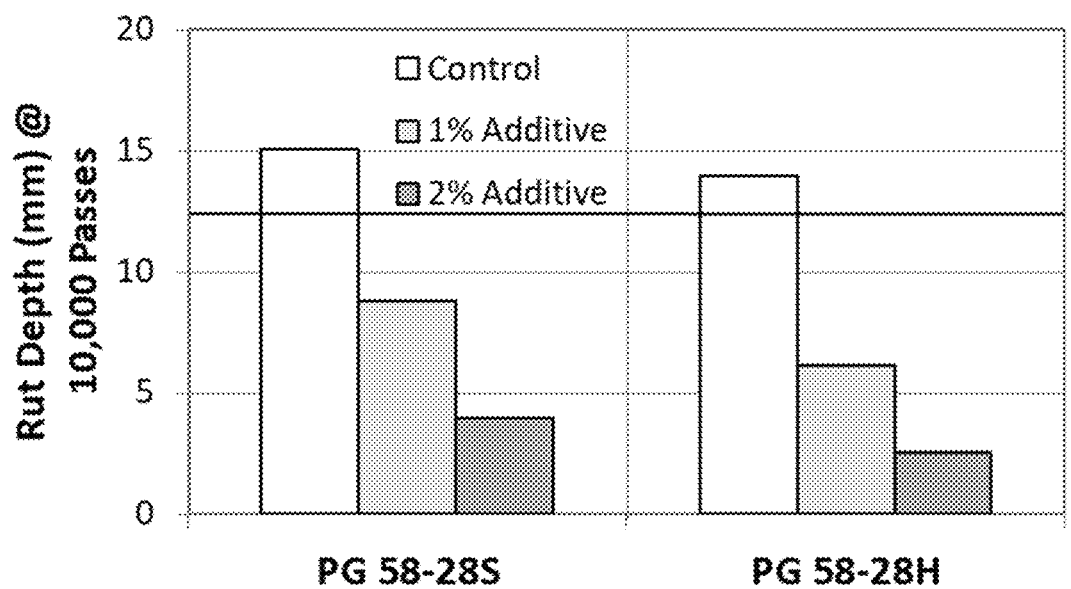
FIG. 7 is a graph showing rutting performance for different binder grades of hybrid composites according to aspects of the present disclosure when used in flexible paving applications.

In FIG. 7, the rutting results for different binder grades are shown. Asphalt binders are graded or classified based on properties measured using several different tests at a range of temperatures. In the Performance Grading (PG) system, the tests are performed at high temperature for rutting resistance and intermediate and low temperatures for cracking resistance. In FIG. 7, the binders have the same low temperature cracking performance, as indicated by the −28, but different high temperature rutting performance, as indicated by the (S) for standard traffic and (H) for high traffic. To improve the performance from (S) to (H), polymer modification was added to the base (S) binder. As seen in FIG. 7, for a given binder, the inclusion of the hybrid additive decreased the rut depth by more than 50%, which is a desirable property. The figure also shows that polymer modification (H) only provides a little more rutting resistance than the base binder (S). The results show that increasing the binder grade from (S) to (H) for heavier traffic can be more effectively achieved using the hybrid additive that is introduced using a dry process instead of polymers mixed into the binder.

Figure 8:
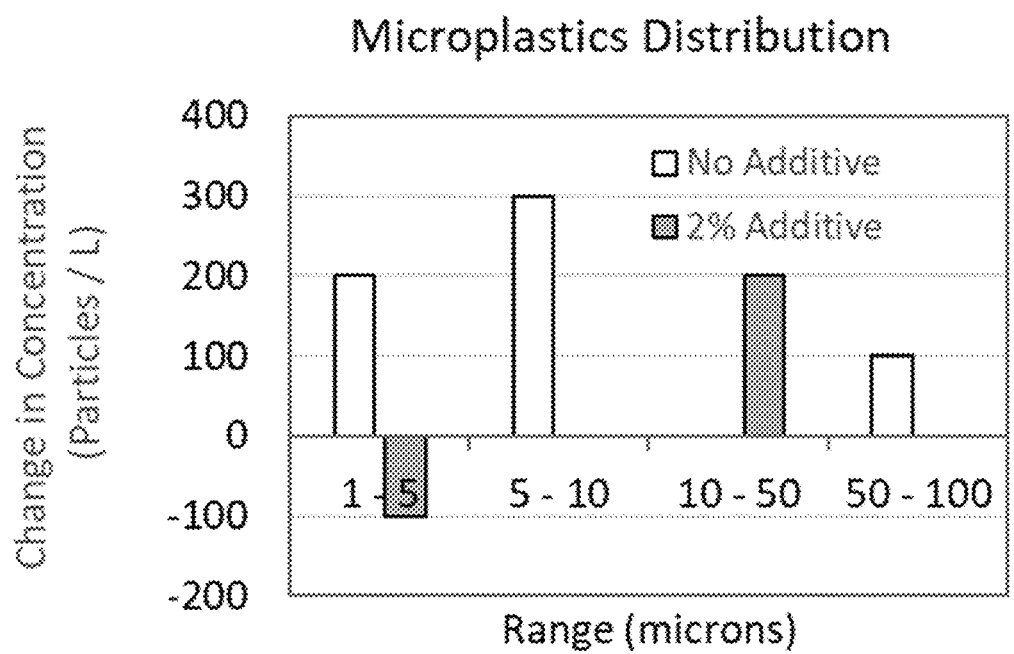
FIG. 8 is a graph showing distribution of microplastics in water samples from Hamburg wheel tracking (HWT) testing of asphalt specimens without and with the hybrid additives according to the present disclosure.

In FIG. 8, results of the distribution of microplastics are shown for an asphalt mixture with and without structural polymers. The chart shows the change in microplastic by comparing counts of particles per liter for the conditions of before (baseline) and after HWT testing. The HWT test is an aggressive, destructive asphalt mixture test that represents a worse-case scenario for an asphalt pavement regarding material degradation and thereby release of particulates. The results show that the mixture without the additive had a net increase of 600 particles/L while the mixture with the additive had a net increase of 100 particles/L. The hybrid additive significantly reduces the total number of particles of microplastics even though the number of plastic particles in the hybrid polymer asphalt mixture increased.

Results of the absorption of asphalt binder into an aggregate for an asphalt mixture with and without the hybrid additive are shown in Table 1. Asphalt that is absorbed into the aggregate is not available on the surface to perform many of the desirable properties of asphalt mixtures including increased strength, rutting resistance, cracking resistance, and water-proofing. Furthermore, the absorption of binder into an aggregate decreases the economics of an asphalt mixture. If an aggregate has a high absorption (>1.5%), then potentially up to 30% of the asphalt is absorbed into the aggregate. To achieve the same performance as a mix with no absorption of the effective binder content, the amount of binder equivalent to the absorbed binder has to be added to the mixture, which negatively affects the economics of the mixture.

TABLE 1

| Hybrid Polymer Additive | $G_{sb}$ Aggregate Bulk Specific Gravity | $G_{mm}$ Maximum Asphalt Mixture Specific Gravity | $P_b$ Percent of Binder (by weight of total mix) | $G_{se}$ Aggregate Effective Specific Gravity | $V_{ba}/V_b$ (%) Percentage of Absorbed Binder/ Total Binder | Percentage of Absorbed Binder (by weight of total mix) |
|---|---|---|---|---|---|---|
| 0% | 2.656 | 2.493 | 4.8 | 2.685 | 8.2 | 0.39 |
| 2% | 2.656 | 2.479 | 4.8 | 2.668 | 3.3 | 0.16 |

TABLE 1-continued

| Hybrid Polymer Additive | $G_{sb}$ Aggregate Bulk Specific Gravity | $G_{mm}$ Maximum Asphalt Mixture Specific Gravity | $P_b$ Percent of Binder (by weight of total mix) | $G_{se}$ Aggregate Effective Specific Gravity | $V_{ba}/V_b$ (%) Percentage of Absorbed Binder/ Total Binder | Percentage of Absorbed Binder (by weight of total mix) |
|---|---|---|---|---|---|---|

Note:
$G_{sb}$, $G_{mm}$, and $P_b$ are measured values. The remaining values are calculated using these three values.

Research has shown that binder can be selectively absorbed into an aggregate, which means the softer and more flexible components of the asphalt binder can be absorbed while leaving the harder, more brittle, and aging-prone components on the surface of the aggregate, which results in poor performance of the mixture (SHRP-A/UIR-90-009 Report, 1990). In general, it is desirable to have less asphalt absorbed into the aggregate for performance and economic reasons. Results shown in Table 1 demonstrate that the presently disclosed hybrid additive can reduce the absorption of binder in the aggregate from 8% to 3% of the total binder when included at 2% by weight of the total asphalt binder. This reduction in absorbed binder is equivalent to increasing the asphalt content (% AC) by approximately 0.2%, which is significant. The increased effective asphalt content is equal to approximately $1.00/mix ton (estimated based on 2021 pricing), which is also significant in the economically sensitive environment of low-cost bidding.

Example 2: Hybrid Concrete Composites Comprising the Hybrid Additive

Figure 9:
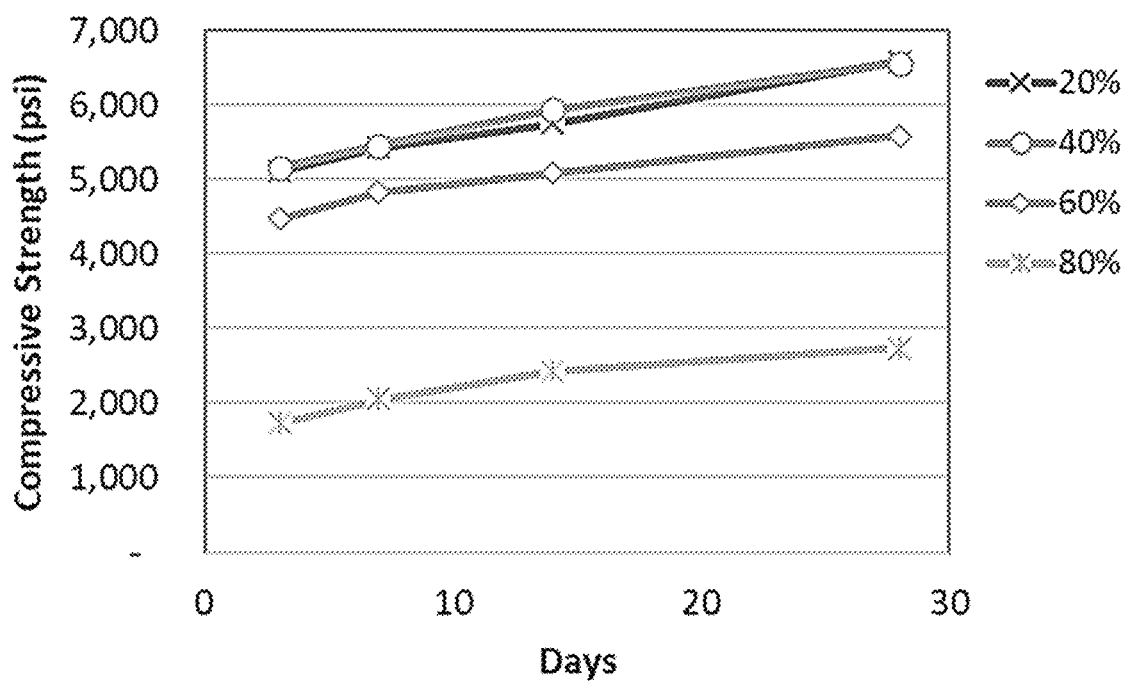
FIG. 9 is a graph showing compressive strength over time for hybrid composites formed with different quantities of aggregate replacement with a hybrid additive according to the present disclosure when mixed with typical quantity of Portland cement (590 lbs./cy).

A hybrid concrete composite was formed comprising varied amounts of the hybrid additive disclosed herein. In FIG. 9, the compressive strength results for a hybrid composite formed with a Portland cement binder and different quantities of hybrid additive as aggregate replacement are shown. The quantities (volumes) of cement and water did not change during this testing. The aggregates were replaced by hybrid additive at different amounts (% of total volume of aggregates) such that the total aggregate/hybrid additive remained constant (i.e., mimicking an unchanged amount of aggregate).

Figure 11:
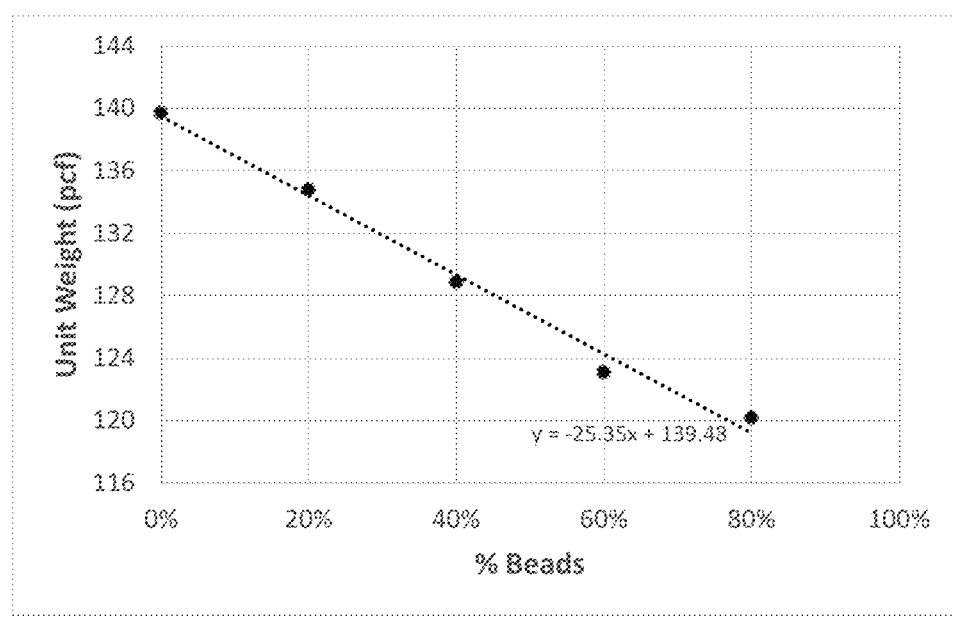
FIG. 11 is a graph showing the unit weight for hybrid composites formed with different quantities of aggregate replacement with a hybrid additive according to the present disclosure.

The results in FIG. 9 show that the hybrid additive provides a strong structure for the cement matrix to develop high strength, i.e., greater than 6,000 psi at 28 days, which is classified as high-strength concrete. The strength was high for 20% and 40% replacement by volume of all aggregates (sand and rock). A slight decrease in strength occurred at 60% replacement. At 80%, the strength was reduced to approximately 3,000 psi at 28 days, which is still acceptable strength for many applications such as sidewalks, wall panels, and cement blocks. Since the structural polymers have a lower density than aggregates, the overall density of the concrete decreases as the % volume of hybrid additive increases. Lighter concrete has many applications such as floors in buildings, wall panels, concrete blocks, and geotechnical applications. The reduction in weight, i.e., pounds per cubic foot (pcf), for the hybrid composites having various amounts of the aggregate replaced with hybrid additive is shown in FIG. 11 (e.g., same hybrid composites shown in FIG. 9).

Figure 10:
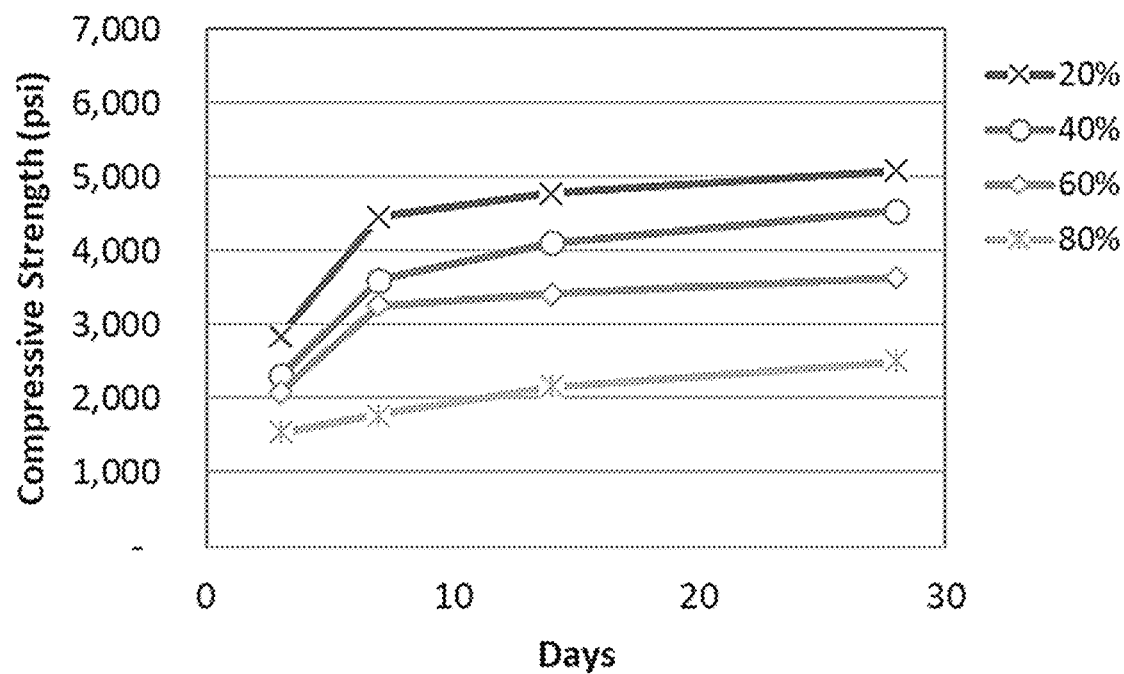
FIG. 10 is a graph showing compressive strength over time for hybrid composites formed with different quantities of aggregate replacement with a hybrid additive according to the present disclosure when mixed with reduced quantity of Portland cement (540 lbs./cy).

In FIG. 10, the compressive strength results for a hybrid concrete composite comprising a Portland cement binder and varied amounts of the hybrid additive as aggregate replacement are shown. The difference between FIGS. 9 and 10 is the quantity of cement was reduced from 590 pounds to 540 pounds per cubic yard of concrete. This reduction in cement makes the construction composite material more economical and sustainable due to the use of less Portland cement and more recycled structural polymers. The results show that the structural polymers provide a strong structure for the cement matrix to develop high strength even with a reduced quantity of cement. The strength for 20% and 40% replacement was greater than 4,000 psi, which is a common strength requirement for Portland cement concrete. The mixtures in these tests developed most of their ultimate 28-day strengths by 7 days, which is desirable in tight construction schedules.

Figure 12A:
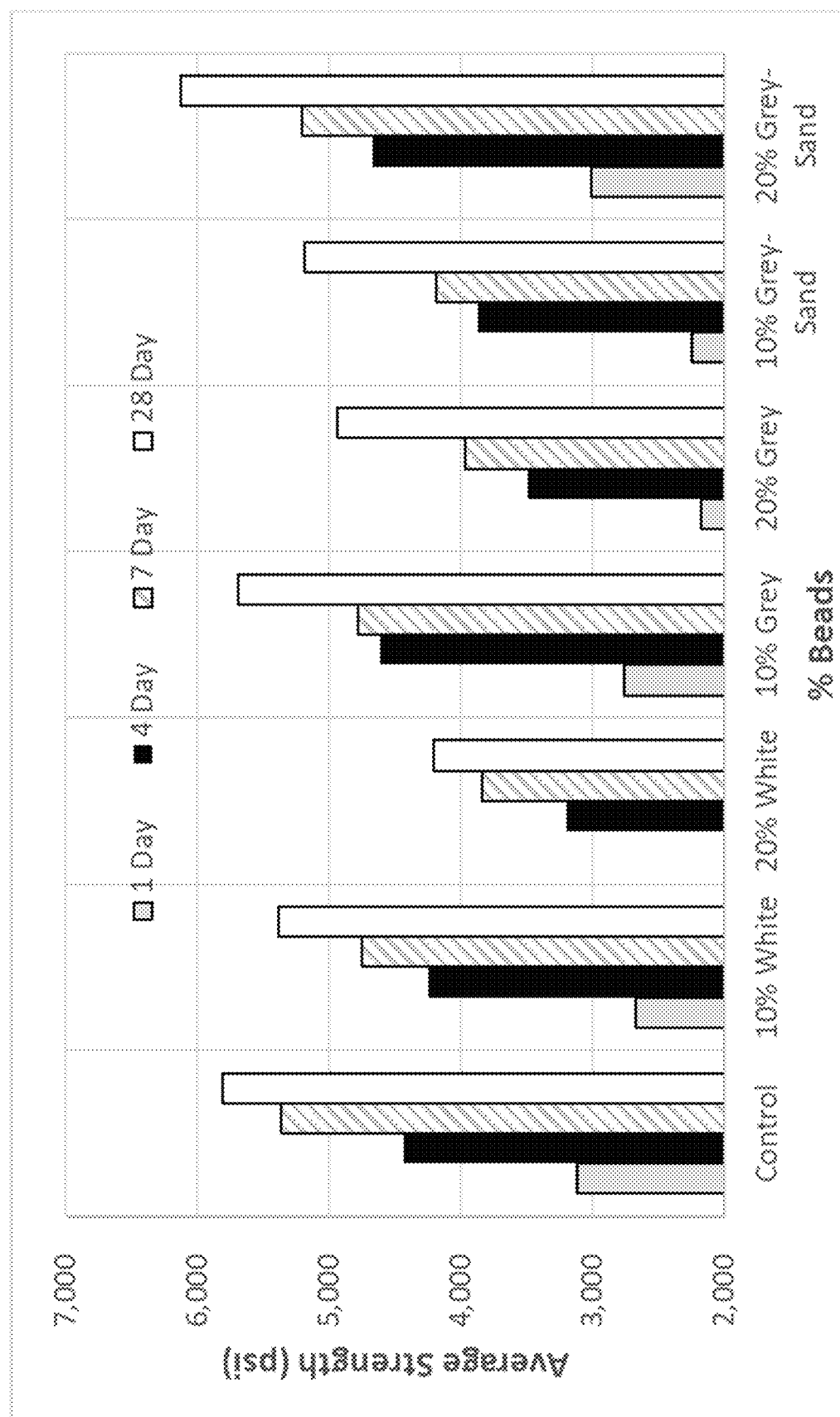
FIGS. 12A and 12B are graphs showing compressive strength over time for hybrid composites formed with different quantities of aggregate replacement with various hybrid additives according to the present disclosure.
Figure 12B:
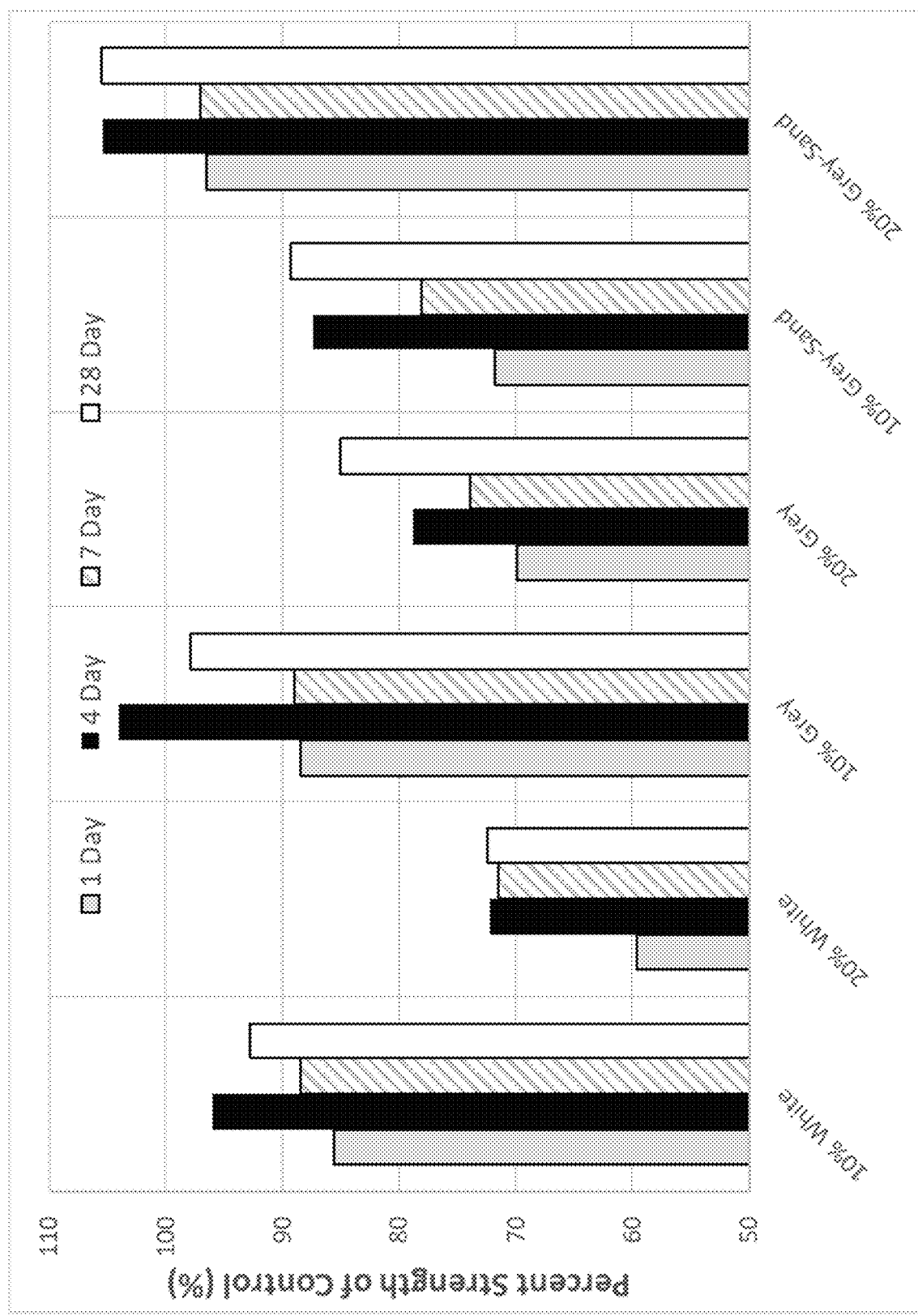

In FIGS. 12A and 12B, the compressive strength results for a hybrid concrete composite comprising a Portland cement binder and different quantities and types of hybrid additive as aggregate replacement are shown. The different types of hybrid additives are labeled as grey and white. The percentage listed in the labels is the percent (by weight) of the aggregate replaced by the hybrid additives. For the samples labeled "grey-sand", only the sand portion of the aggregate (approximately half of the total aggregate) was replaced.

The results in FIG. 12A shown the measured compressive strengths for the different mixtures for 1-, 4-, 7-, and 28-day strengths. In FIG. 12B, the percentage of strength of the control mixture for a given day is shown. FIG. 12B shows that the strength of the mixtures increases at similar rates to the control mixture. The 28-day strengths for 10% Grey (all aggregate) and 20% Grey-Sand are very similar strengths to the control mix.

Results of chemical and mechanical wearing tests of expanded hybrid additives used in hybrid concrete composites are shown in Table 2. The results show that the hybrid additives prevent common issues in aggregates used in PCC due to exposure to different mineral salts, magnesium chloride and sodium chloride. The results show that the percent loss is less than 1.0%, which is well below the specification of less than 15% loss for both magnesium and sodium sulfate testing. The hybrid additives replace the aggregates and prevent the adverse reactions that occur between the mineral salts and the aggregates.

Furthermore, the hybrid additives are resilient, which is shown by the Los Angeles Abrasion test results in Table 2. The L.A. Abrasion test is an aggressive test to measure aggregate durability to abrasion of steel balls mixed with the aggregate in a container, i.e., a rotating steel drum steel fitted with an internal shelf that lifts and drops the steel balls and sample with each revolution, generating impact forces. The results show the % wear, which is a percentage of the material worn away, is approximately 1%, which is much less than the limit of 40% loss for typical aggregates.

TABLE 2

| Sample ID | Magnesium Sulfate Percent Loss, % | Sodium Sulfate Percent Loss, % | L.A. Abrasion Percent Wear, % |
|---|---|---|---|
| 15 | 0.1 | 0.8 | 1.1 |
| 13 | 0.2 | 0.6 | 1.1 |
| 08 | 0.2 | 0.5 | 1.3 |
| 07 | 0.1 | 0.5 | 1.2 |
| Specification | <15.0% Loss | <10.0% Loss | <40.0% Loss |

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A hybrid additive for use in construction materials, the hybrid additive comprising pellets formed of:
   95 wt. % to 99.9 wt. % of a plastic or polymeric material; and
   0.1 wt. % to 5 wt. % of one or more of fibers, pozzolans, nano-carbon tubes, glass, recycled asphalt shingles (RAS), liquid anti-strip, hydrated lime, calcium carbonate, graphene, rejuvenators, cementitious material, and ground tire rubber.

2. The additive of claim 1, wherein the pellets are coated with a cementitious material that includes one or more of calcium carbonate, graphene, hydrated lime, and pozzolanic materials.

3. The additive of claim 1, wherein the plastic or polymeric material comprises recycled materials.

4. The additive of claim 1, wherein the plastic or polymeric material comprises one or more of high-density polyethylene (HDPE), low density polyethylene (LDPE), polypropylene, polystyrene, polytetrafluoroethylene in compacted, heat-treated, or gas-expanded form.

5. The additive of claim 1, wherein the pellets have a length of 3-13 mm, a diameter of 1-13 mm, and an end curvature of 1° to 30° measured as a total deflection from a longitudinal axis thereof.

6. The additive of claim 1, wherein the pellets of the hybrid additive comprises a melting temperature of 95-140° C.

7. A hybrid construction material comprising:
   0.5 to 15 wt. % of an asphalt binder;
   0.1 to 10 wt. % of the hybrid additive according to claim 1; and
   an aggregate,
   wherein the wt. % is based on a total weight of the hybrid construction material.

8. The material of claim 7, wherein the aggregate and the hybrid additive are provided at 85-99.5 wt. % based on a total weight of the hybrid construction material, and wherein the hybrid additive is provided at 2-4 wt. %.

9. The material of claim 7, wherein the pellets of the hybrid additive have a length of 3-13 mm, a diameter of 1-13 mm, an end curvature of 1° to 30° measured as a total deflection from a longitudinal axis thereof, and a melting temperature of 95-140° C.

10. The material of claim 7, wherein the plastic or polymeric material comprises one or more of high-density polyethylene (HDPE), low density polyethylene (LDPE), polypropylene, polystyrene, polytetrafluoroethylene in compacted, heat-treated, or gas-expanded form.

11. A flexible paving structure comprising a cured hybrid construction material according to claim 7, wherein the hybrid additive is added at 2-4 wt. % and improves performance characteristics of the paving structure as compared to a paving structure formed without the hybrid additive, wherein the performance characteristics comprise one or more of:
   reduce rut depth by at least 50% as measured by a Hamburg Tracking Wheel (HWT) test;
   increase moisture resistance by at least 50% as measured by stripping inflection points (SIP) from a set of HWT tests;
   increase cracking resistance by approximately 5% as measured by a Disc-shaped Compact Tension (DCT) test; and
   reduce absorption of the binder into the aggregate by at least 50%.

12. A method for forming the flexible paving structure according to claim 11, the method comprising:
   heating aggregate to a temperature of 105-400° C.;
   lowering the temperature of the aggregate to below 175° C.;
   dry mixing hybrid additive with the aggregate to form a dry mix;
   adding the dry mix to heated asphalt binder to form a hybrid construction material; and
   compacting the hybrid construction material at 85-175° C. to form the flexible paving structure.

13. A hybrid construction material comprising:
   0.5-30 wt. % of a cementitious binder;
   10 to 60 wt. % of the hybrid additive according to claim 1; and
   an aggregate,
   wherein the wt. % is based on a total weight of the hybrid construction material.

14. The material of claim 13, wherein the aggregate and the hybrid additive are provided at 70-99.5 wt. % based on a total weight of the hybrid construction material, and wherein the hybrid additive is provided at 10-40 wt. %.

15. The material of claim 13, wherein the pellets of the hybrid additive have a length of 3-13 mm, a diameter of 1-13 mm, an end curvature of 1° to 30° measured as a total deflection from a longitudinal axis of the pellet, and comprise dimples, indentations, or inclusions on a surface of the pellet that contain the cementitious material.

16. The material of claim 13, wherein the pellets comprise a plastic or polymeric material and fibers, wherein the plastic or polymeric material has a melting temperature of 95-140° C.

17. The material of claim 13, wherein the pellets comprise a plastic or polymeric material selected from the group consisting of high density polyethylene (HDPE), low density polyethylene (LDPE), polypropylene, polystyrene, and polytetrafluoroethylene in compacted, heat-treated, or gas-expanded form.

18. A flexible cementitious structure comprising a cured hybrid construction material according to claim 13, wherein the hybrid additive is added at 10-40 wt. % and improves performance characteristics of the cementitious structure as compared to a structure formed without the hybrid additive, wherein the performance characteristics comprise improved resistance to chemical wear by at least 50%, and improved resistance to mechanical wear by at least 50%, as measured by an L.A. Abrasion test.

19. A method for forming the cementitious structure according to claim 18, the method comprising:
   dry mixing the cementitious binder, aggregate, and hybrid additive of the hybrid construction material at ambient conditions to form a dry mix;
   adding sufficient water to the dry mix to form a cementitious slurry that cures to form the cementitious structure.

20. A hybrid construction material comprising:
   0.5 to 15 wt. % of an asphalt binder;
   0.1 to 10 wt. % of the hybrid additive according to claim 1; and
   an aggregate,
   wherein the wt. % is based on a total weight of the hybrid construction material.

21. A flexible paving structure comprising a cured hybrid construction material according to claim 20, wherein the hybrid additive is added at 2-4 wt. %.

22. A method for forming the flexible paving structure according to claim 21, the method comprising:
   heating aggregate to a temperature of 105-400° C.;
   lowering the temperature of the aggregate to below 175° C.;
   dry mixing hybrid additive with the aggregate to form a dry mix;
   adding the dry mix to heated asphalt binder to form a hybrid construction material; and
   compacting the hybrid construction material at 85-175° C. to form the flexible paving structure.

23. A hybrid additive for use in construction materials, the additive comprising:
   pellets formed of a plastic or polymeric material, and one or more of fibers, pozzolans, nano-carbon tubes, glass, recycled asphalt shingles (RAS), liquid anti-strip, hydrated lime, calcium carbonate, graphene, rejuvenators, cementitious material, and ground tire rubber,
   wherein the pellets are coated with a cementitious material that includes one or more of calcium carbonate, graphene, hydrated lime, and pozzolanic materials, and
   wherein the pellets comprise dimples, indentations, or inclusions on a surface of the pellet that contain the cementitious material.

* * * * *